United States Patent [19]
Hironaka et al.

[11] Patent Number: 6,156,099
[45] Date of Patent: Dec. 5, 2000

[54] METHOD AND APPARATUS FOR SELF-CLEANING DUST COLLECTION ELECTRODE OF ELECTRONIC DUST COLLECTOR AND ELECTRONIC DUST COLLECTOR HAVING SELF-CLEANING FUNCTION AND AIR CONDITIONER WITH ELECTRONIC DUST COLLECTOR

[75] Inventors: Yasumasa Hironaka, Nara; Yoriko Uemura, Kobe, both of Japan

[73] Assignee: Funai Electric Co., Ltd., Japan

[21] Appl. No.: 09/200,510

[22] Filed: Nov. 25, 1998

[30] Foreign Application Priority Data

Nov. 26, 1997 [JP] Japan ................................ 9-324808

[51] Int. Cl.[7] ........................................... B03C 3/74
[52] U.S. Cl. ................. 95/74; 55/282.3; 55/DIG. 10; 96/28; 96/30
[58] Field of Search ................... 96/15, 18, 19, 96/28, 69, 96, 83, 98, 74, 30, 25; 95/57, 59, 60, 68, 73, 74; 55/282.3, 360, DIG. 10

[56] References Cited

U.S. PATENT DOCUMENTS

| | | | |
|---|---|---|---|
| 4,133,652 | 1/1979 | Ishikawa et al. | 55/414 X |
| 4,544,388 | 10/1985 | Rao et al. | 55/282.3 X |
| 4,871,515 | 10/1989 | Reichle et al. | 422/174 |
| 5,290,343 | 3/1994 | Morita et al. | 96/96 X |

FOREIGN PATENT DOCUMENTS

| | | | |
|---|---|---|---|
| 2242152 | 3/1975 | France . | |
| 3810910 | 8/1989 | Germany | 96/28 |
| 06180127 | 6/1994 | Japan | 55/DIG. 10 |
| 6180128 | 6/1994 | Japan | 55/DIG. 10 |
| 2229117 | 9/1990 | United Kingdom | 96/28 |

Primary Examiner—Richard L. Chiesa
Attorney, Agent, or Firm—Morrison Law Firm

[57] ABSTRACT

An electronic dust collector for collecting and removing dust from an air stream uses a corona discharge between a discharge electrode and a dust collection electrode to ionize the dust particles which are then attracted to, and held, on the surface of the negatively charged dust collection electrode. The surface of the dust collection electrode includes a catalyst layer for oxidizing and decomposing the deposited dust thereon. A heater is included in the dust collection electrode for periodic self-cleaning. The application of electricity to the heater is controlled to produce slow moderate temperature elevation during the self-cleaning of the dust collection electrode. This permits stepwise oxidation and decomposition of the dust deposited on the dust collection electrode, thereby cleaning the dust collection electrode by removing the dust on the dust collection electrode while suppressing generation of smoke and odor which would otherwise occur by burning of the dust.

7 Claims, 6 Drawing Sheets

METHOD AND APPARATUS FOR SELF-CLEANING DUST COLLECTION ELECTRODE OF ELECTRONIC DUST COLLECTOR AND ELECTRONIC DUST COLLECTOR HAVING SELF-CLEANING FUNCTION AND AIR CONDITIONER WITH ELECTRONIC DUST COLLECTOR

BACKGROUND OF THE INVENTION

1. Field of the Invention

The present invention relates to a method for self-cleaning a dust collection electrode of an electronic dust collector, an electronic dust collector having a self-cleaning function, and an air conditioner equipped with the electronic dust collector.

2. Description of the Prior Art

Hitherto, as a device for purifying interior air, there has been known a deodorizing equipment. This deodorizing equipment includes a deodorizing catalyst, which adsorbs the odorous components contained in room air such as tobacco smoke to carry out deodorizing air in room. However, such deodorizing equipment has drawback in its inability to remove dust having relatively large particle size such as cotton dust. As a result, such deodorizing equipment has poor air purification capacity. Air purification equipment capable of removing dust such as cotton dust includes an electronic dust collector. An electronic dust collector is equipped with a discharge electrode and a collection electrode. A high voltage applied between these electrodes ionizes the dust and other fine particles contained in the air surrounding the discharge electrode. The ionized particles are attracted to, and adsorbed on, the collection electrode to purify air. In such electronic dust collector, in order to operate the device for a long period of time without maintenance, there has been contrived a self-cleaning type (maintenance-free type), in which the dust collection electrode includes a heater, with which the dust adsorbed to the collection electrode is removed by oxidation and decomposition.

Besides, there is known an air conditioner having an interior unit including an electronic dust collector so as to enhance the function of air conditioner. For example, as shown in Japanese Patent Publication (Unexamined) No. SHO 64-28427, an electronic dust collector is located on the upstream side of the heat exchanger, i.e., between the front grill and the heat exchanger provided on the depth side thereof. This collects the dust contained in the air taken into the apparatus by adsorbed it on the dust collection electrode to effect air cleaning. In this manner, by incorporating the dust collector in the internal unit of the air conditioner, the air conditioner is provided with the added function of air cleaner in addition to the original air conditioning function.

However, in the air conditioner with electronic dust collector as shown in the above publication, because of the provision of the dust collector on the upwind side of the heat exchanger, induction of air is inhibited, thereby lowering the original air conditioning function. In this connection, there has been contrived an air conditioner with electronic dust collector having an electronic dust collector comprising a linear discharge electrode and a planar dust collection electrode provided in the casing of the interior unit on the lee side of the heat exchanger. However, when the dust collector is provided in the casing, a problem of difficulty maintaining the dust collection electrode occurs. To cope with this, in the same manner as in the above electronic dust collector, there has been designed a self-cleaning type (maintenance-free type) air conditioner with electronic dust collector wherein, as a dust collection device. A heater is provided in the dust collection electrode to decompose the dust by oxidation and thereby to remove the dust adsorbed to the dust collection electrode.

However, in such self-cleaning type electronic dust collector and electronic air conditioner with electronic dust collector, there is no consideration on the heater temperature elevation rate or the like. That is, the heater temperature is suddenly elevated during the self-cleaning. Therefore, such a system produces smoke and generates odor. Also, the dust may catch fire.

OBJECTS AND SUMMARY OF THE INVENTION

The present invention has been made to resolve the problems as noted above.

It is therefore an object of the present invention to provide a method for self-cleaning a dust collection electrode of an electronic dust collector, an electronic dust collector having self-cleaning function, and an air conditioner equipped with the electronic dust collector which can suppress burning, smoking, or odor by limiting the rate at which the temperature of the dust collection electrode increases. By slowly increasing the temperature the dust or fine particles are dried and oxidized without burning.

In order to attain the above object, the present invention provides a method for self-cleaning a dust collection electrode of an electronic dust collector comprising a discharge electrode and a dust collection electrode provided at a predetermined distance with a high voltage applicable between them, the dust collector being designed to collect dust contained in air on the dust collection electrode by way of discharge effect. The dust collection electrode is equipped with a heater for self-cleaning the dust collection electrode, and with a catalyst for oxidizing and decomposing the deposited dust on its surface. The temperature of the heater is increased slowly to oxidize and decompose the dust deposited on the catalyst stepwise to effect self-cleaning of the dust collection electrode.

In the above method, during the dust collection operation of the electronic dust collector, a high voltage is applied between the discharge electrode and the dust collection electrode. The dust contained in the air introduced in the dust collector is ionized by the discharge electrode and attracted to and adsorbed on the dust collection electrode, by which the air is purified. Further, during the self-cleaning, the heater is controlled by controlling electric current to cause the dust collection electrode to be mildly subjected to temperature elevation, by which the dust (containing organic substance) and fine particles deposited on the electrode are oxidized and decomposed stepwise by the catalytic action of the catalyst, and the dust is ultimately converted into colorless, odorless gases of carbon dioxide and vapor. As a result, while the generation of smoke and odor by burning of dust is suppressed, the dust on the dust collection electrode is removed and the dust collection electrode is self-cleaned.

It is also desirable, during the self-cleaning, to control the heater by controlling electric current so as to bring the surface temperature of the dust collection electrode from room temperature to a temperature below the firing temperature of the dust component substance.

Also, the present invention provides, in a dust collection electrode of an electronic dust collector comprising a discharge electrode and a dust collection electrode spaced apart a predetermined distance with a high voltage applicable between them, the dust collector being designed to collect dust contained in air onto the dust collection electrode by way of discharge effect, the dust collection electrode being equipped with a heater for self-cleaning the dust collection electrode. A catalyst on the dust collection electrode aids in oxidizing and decomposing the deposited dust on its surface. The electric current to the heater is controlled so that the surface of the dust collection electrode is heated to show slow temperature rise during the self-cleaning of the dust collection electrode.

According to the above constitution, during self-cleaning the dust collection electrode is mildly heated under control of electricity application by the control means, and there is obtained the same effect as that mentioned above. Normally, this self-cleaning may be practiced as necessary after completion of the dust collection operation.

Also, it is desirable for the above control means to control electric current to the heater so that the surface temperature of the dust collection electrode gradually rises from room temperature to a temperature less than the ignition temperature of the dust component material during the self-cleaning.

Furthermore, the present invention provides an air conditioner with electronic dust collector having a self-cleaning function for purifying air by collecting dust in air by the use of electric discharge effect, comprising: a casing having an air suction port and an air outlet port; a heat exchanger in the casing facing to the suction port; a fan for circulating air into the suction port through the heat exchanger and air passages in the casing and out the outlet port; and an electronic dust collector arrayed in the air passages for collecting dust in air which passes through the air passages by using the discharge effect between the discharge electrode and the dust collection electrode, the dust collection electrode being equipped with a heater for self-cleaning the dust collection electrode, and with a catalyst for oxidizing and decomposing the deposited dust on its surface; characterized by having a self-cleaning function with provision of a control means for controlling the electric current to the heater so that the surface temperature of the dust collection electrode gradually rises during the self-cleaning of the dust collection electrode.

In this constitution, during the air conditioning operation, by driving of the heat exchanger and the fan, the air taken in from the suction port of the casing undergoes cooling or heating by the heat exchanger, after which it is circulated in the air passage. At this time, due to the application of a high voltage between the discharge electrode of the electronic dust collector provided on the air passage and the dust collection electrode, the dust contained in the air passing through the air passage is ionized and deposited on the dust collection electrode. By this step, the air is cleaned and blown from the outlet port. Further, during the self-cleaning of the dust collection electrode, by the energizing control to the heater, the dust collection electrode is subjected to a slow temperature rise to give the action similar to that described above. This self-cleaning may normally be carried out as necessary after stopping the cooling and heating operation in consideration of the efficiency of cooling or heating.

Briefly stated, the present invention provides an electronic dust collector for collecting and removing dust from an air stream using a corona discharge between a discharge electrode and a dust collection electrode to ionize the dust particles which are then attracted to, and held, on the surface of the negatively charged dust collection electrode. The surface of the dust collection electrode includes a catalyst layer for oxidizing and decomposing the deposited dust thereon. A heater is included in the dust collection electrode for periodic self-cleaning. The application of electricity to the heater is controlled to produce slow moderate temperature elevation during the self-cleaning of the dust collection electrode. This permits stepwise oxidation and decomposition of the dust deposited on the dust collection electrode, thereby cleaning the dust collection electrode by removing the dust on the dust collection electrode while suppressing generation of smoke and odor which would otherwise occur by burning of the dust.

According to an embodiment of the invention, there is provided a method for self-cleaning a dust collection electrode of an electronic dust collector comprising: positioning a discharge electrode and a dust collection electrode spaced a predetermined distance apart in a stream of air, connecting a positive terminal of a DC voltage to the discharge electrode, connecting a negative terminal of the DC voltage to the dust collection electrode, wherein the distance and the DC voltage are effective to produce a corona discharge in the predetermined distance, whereby ionized dust is collected on a surface of the dust collection electrode, coating the dust collection electrode with a catalyst layer, heating the dust collection electrode at a rate and to a final temperature effective to oxidize collected dust without generating fire or smoke, the step of heating including slowly increasing the temperature of the dust collection electrode to oxidize and decompose the dust deposited on the catalyst stepwise.

According to a feature of the invention, there is provided an electronic dust collector comprising: a discharge electrode, a dust collection electrode spaced a predetermined distance from the discharge electrode, means for applying a high voltage between the discharge electrode and the dust collection electrode to produce a corona discharge, a positive terminal of the high voltage being connectable to the discharge electrode, and a negative terminal being connectable to the dust collection electrode, whereby dust is ionized during its passage through the corona discharge, and is attracted to and held on the dust collection electrode, a heater for self-cleaning the dust collection electrode, a catalyst layer on the dust collection electrode for oxidizing and decomposing dust deposited on its surface, a control means for controlling electric current to the heater to increase at a rate which gradually raises a surface temperature of the dust collection electrode during self-cleaning of the dust collection electrode.

According to a further feature of the invention, there is provided an air conditioner with electronic dust collector having a self-cleaning function for purifying air by collecting dust in air by the use of electric discharge effect, comprising: a casing having an air suction port and an air outlet port, a heat exchanger in the casing facing the suction port, a fan for circulating air into the outlet port from the suction port through the heat exchanger and air passages in the casing, an electronic dust collector in the air passages for collecting dust in air which passes through the air passages using the discharge effect between the discharge electrode and the dust collection electrode, the dust collection electrode including a heater associated therewith for self-cleaning the dust collection electrode, a catalyst on a surface of the dust collection electrode for oxidizing and decomposing dust on its surface, a self-cleaning function, and the self-cleaning function including a control means for controlling the electric current to the heater in a manner that gradually heats the surface temperature of the dust collection electrode gradually during self-cleaning of the dust collection electrode.

The above control means desirably control the electric current to the heater so that the surface temperature of the dust collection electrode gradually rises from room temperature to the temperature less than the firing temperature of the dust component material during the self-cleaning.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

DETAILED DESCRIPTION OF THE PREFERRED EMBODIMENT

Referring to FIG. 1 through FIG. 5, an air conditioner with dust collector 1 has both the air conditioning function for cooling or heating air in room and the dust collection function for removing dust contained in interior air to clean air, and is to be fixed to wall or the like through a fixing plate 2. The air conditioner 1 has a casing 10 which opens at its front face as an air suction port 11. An air outlet port 12 is located at the bottom of the casing. A front panel 20, having a front grill 21, is fitted to the air suction port 11 of the casing 10. A heat exchanger 30 in the casing 10 faces the suction port 11 of the casing 10. A cross-flow type fan 40 is located on the depth side of the outlet port 12 so as to circulate air from the suction port 11 through the heat exchanger 30 to the outlet port 12. An electronic dust collector 50 is disposed in the air passage 31 on the back (downstream) side of the heat exchanger 30. A filter 32 is interposed between the front panel 20 and the heat exchanger 30. An angle adjusting type looper 13 is provided at the outlet port 12 of the casing 10. A control circuit 15 (control means) in the casing 10 controls all operations of the air conditioner 1. The heat exchanger 30 is connected by a heat exchanger of an external unit (not illustrated) and a coolant pipe.

Figure 3:
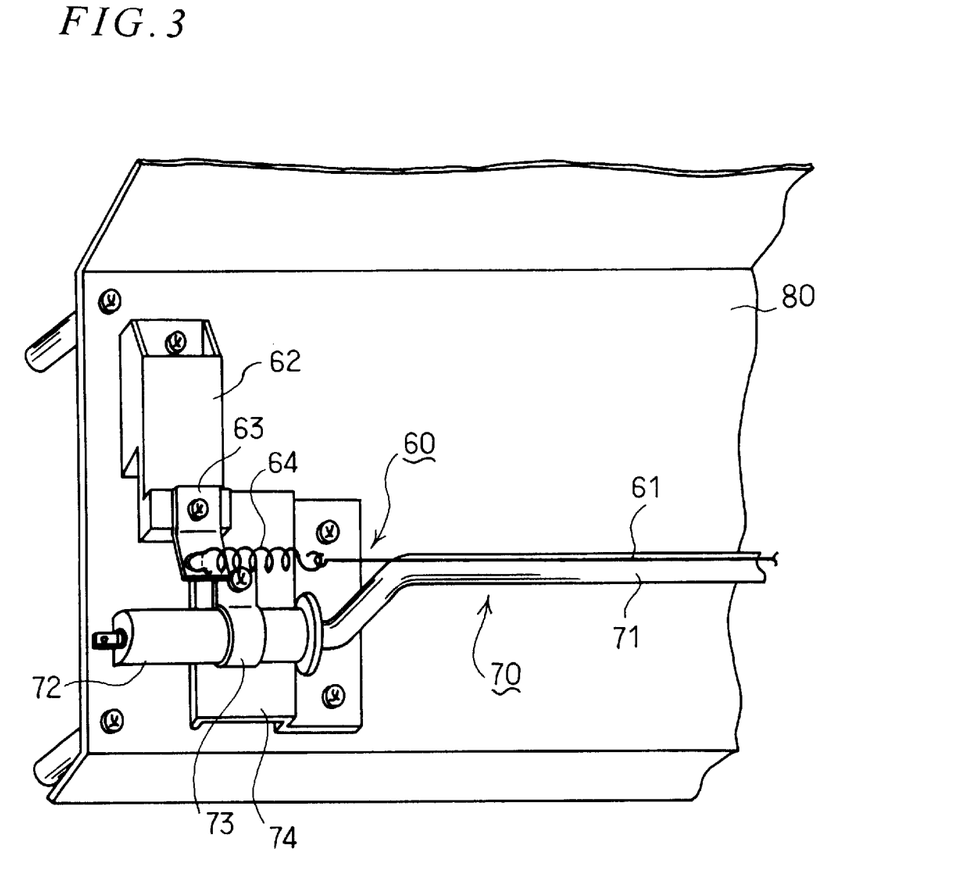
FIG. 3 is a partial perspective view of an electronic dust collector.
Figure 4:
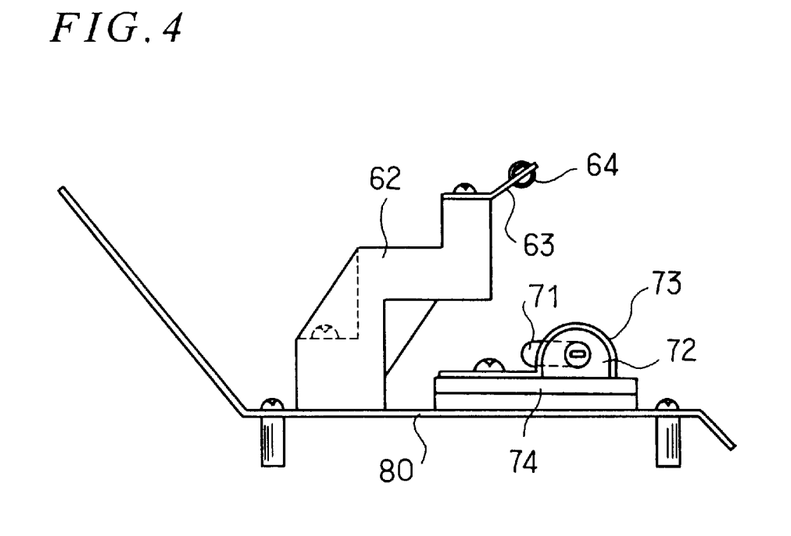
FIG. 4 is a partial side view of an electronic dust collector.
Figure 5:
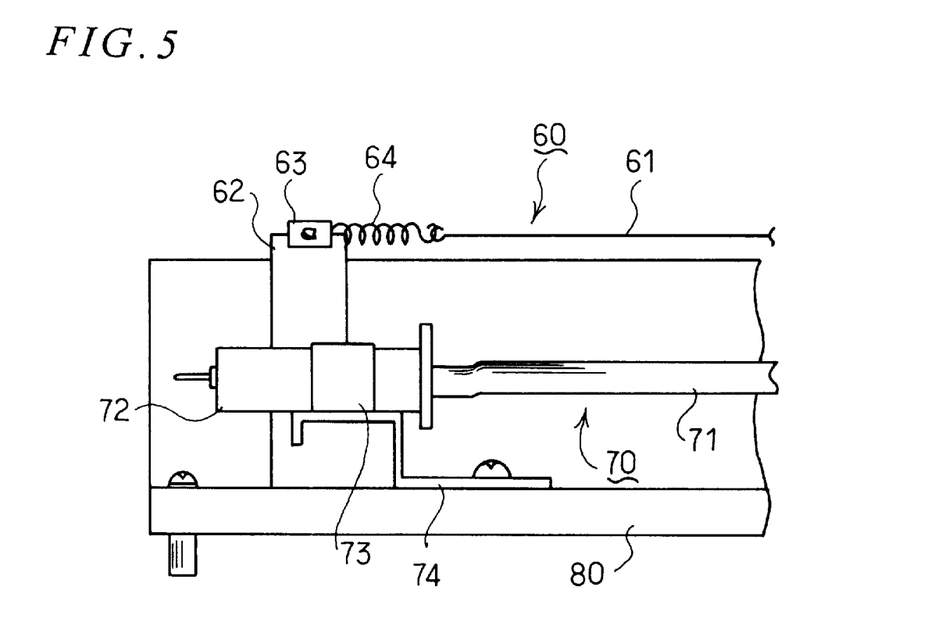
FIG. 5 is a partial bottom view of an electronic dust collector.

The electronic dust collector 50 is made up of a horizontally stretched linear discharge electrode 60 and a bar-like dust collection electrode 70 spaced a predetermined distance from the discharge electrode 60. The dust collection electrode 70 contains a sheathed heater 71 for self-cleaning. A heat shielding plate 80 has mounted thereon the discharge electrode 60 and the dust collection electrode 70. The discharge electrode 60 and the dust collection electrode 70 are fixed to the surface of the vertical back plate part 18 so as to face the inside of the air passage 31.

The discharge line 61, which includes a discharge electrode 60, is held in a set position by the tension of a tensile spring 64 that is connected to an electrode 63 which is fixed at both ends to the holding member 62. A voltage is applied to the discharge line 61 from the electrode 63 through the tensile spring 64. The dust collection electrode 70 is disposed a predetermined distance on the lee side of the air passage 31 from the discharge electrode 60. Lengthwise end parts 72 of dust collection electrode 70 are fixed to holding members 74 by stopper members 73. Positive DC voltage and negative DC voltage are applied to the discharge electrode 60 and the dust collection electrode 70, respectively, when air purification is being performed. The holding member 62 and the holding member 74 are fixed to the heat shielding plate 80.

Figure 6:
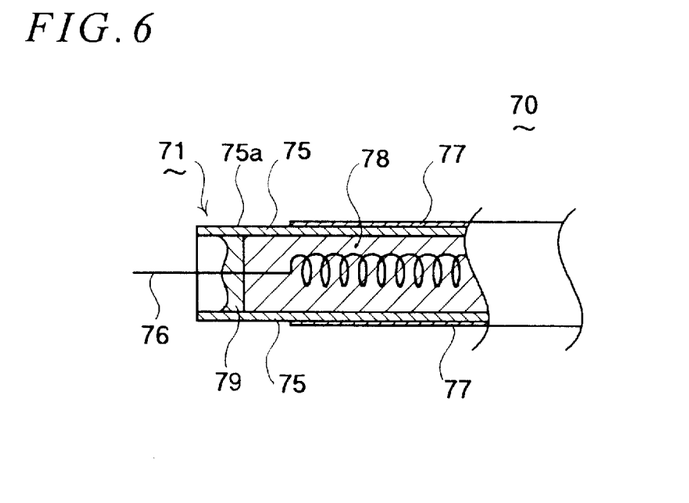
FIG. 6 is a sectional view of an essential part of the dust collector.

In FIG. 6, the dust collection electrode 70 self-contains a sheathed heater 71. The sheathed heater 71 comprises an aluminum metal tube 75 and an electric resistance line 76 inserted in the metal tube 75. Catalyst layers 77 are formed on the surface of the metal tube 75. The catalyst layers 77 may be formed of catalytic substances represented by zeolite, active alumina, manganese dioxide, etc. The catalyst layers are formed by application or welding.

Zeolite (generally called zeolite) has a three-dimensional net structure having hollow parts, which accelerate the reaction of the molecules adsorbed to the inside of the hollow part.

Active alumina (Al2O3) is alumina powder having high adsorption capacity, small crystal particle size, large surface area, and is suitable as a catalyst, catalyst carrier, and adsorbing agent.

Manganese dioxide (MnO2) is capable of functioning as a catalyst in the same manner as zeolite and active alumina as stated above. Further, in order to prevent mutual contact between the metal tube 75 and the electric resistance line 76, the metal tube is filled with magnesium oxide 78. End parts 75a of the metal tube 75 are sealed by glass sealing members 79. This sheathed heater 71 may produce small energy per unit area, e.g., approximately 180 W (Watt).

Figure 1:
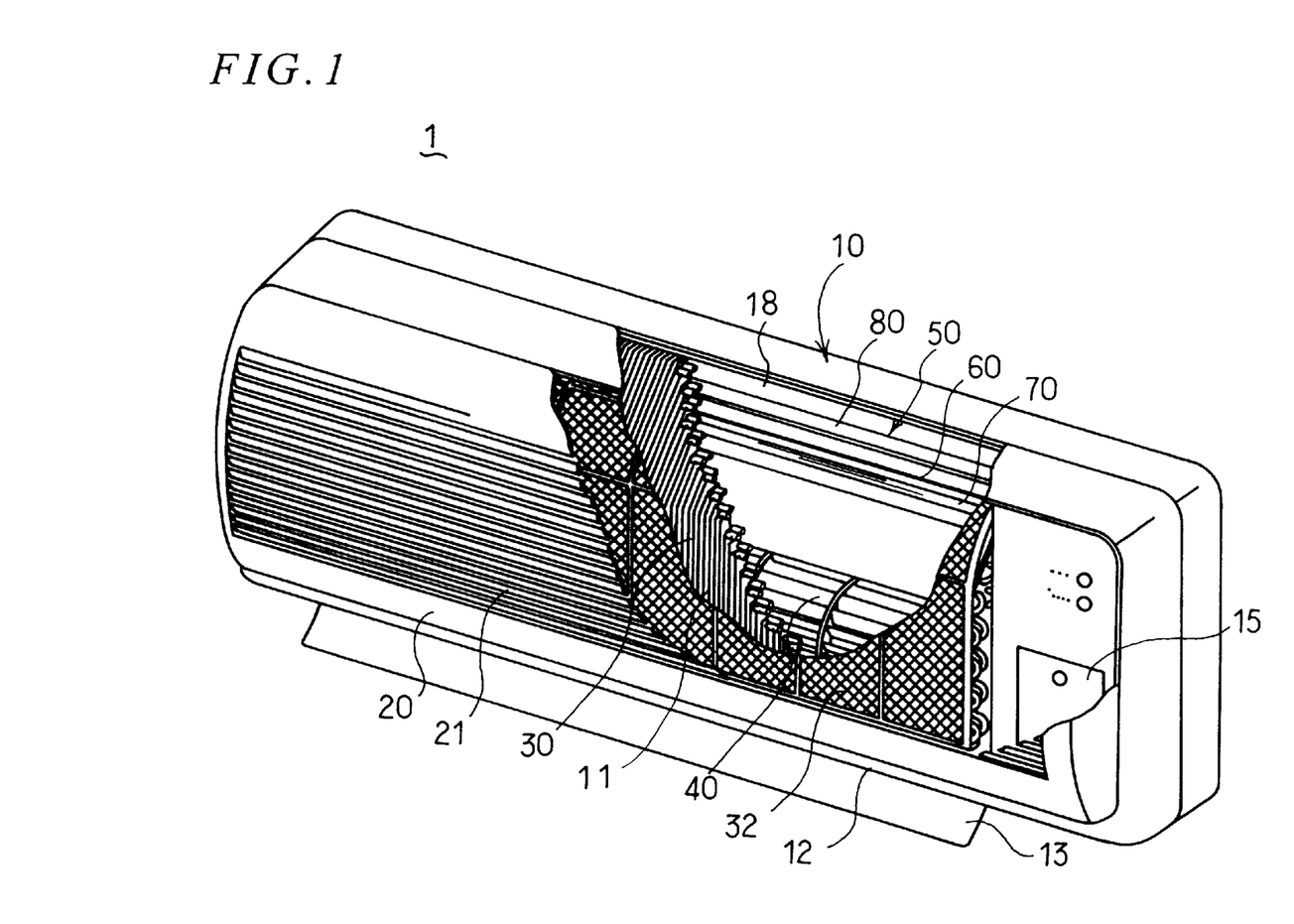
FIG. 1 is a partially broken perspective view of an air conditioner with electronic dust collector according to an embodiment of the present invention.
Figure 2:
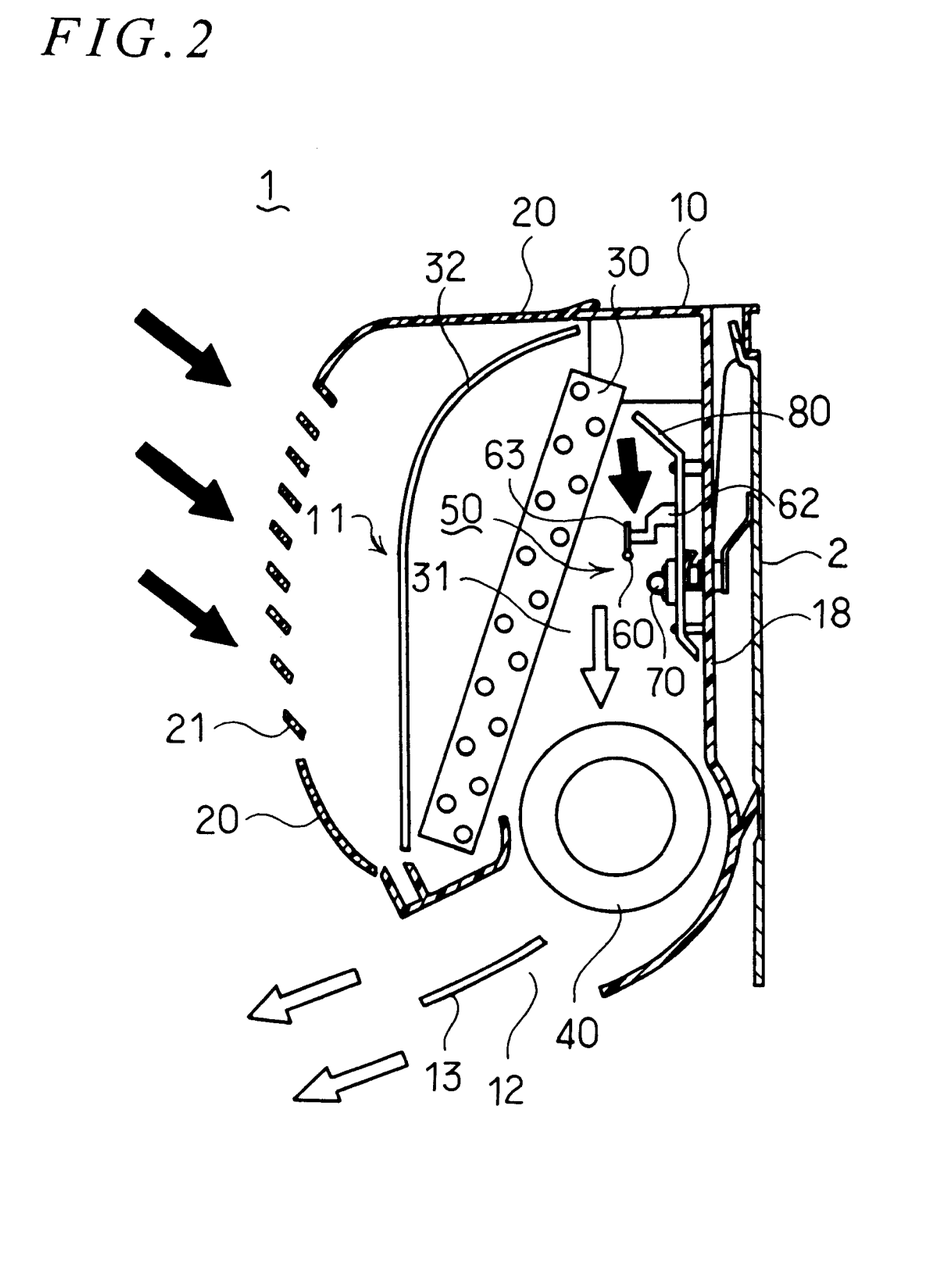
FIG. 2 is a side view of an air conditioner with electronic dust collector showing the flow of air during air conditioning.

During air conditioning, the fan 40 moves air in the room through the front grill 21 of the front panel 20 and the filter 32 and introduces the air into the casing 10. The air then passes through the heat exchanger 30 where it is cooled or heated. After passing the heat exchanger 30, the air flows through the air passage 31 at the back side of the casing 10, moving vertically downward. The air passing through the air passage 31 passes near the periphery of the dust collector 50. Here, a high voltage is applied between the discharge electrode 60 and the dust collection electrode 70 of the dust collector 50. This DC voltage is high enough to generate a corona discharge between the two electrodes 60 and 70. As a result, dust such as fine particles of tar (oil smoke) of tobacco present in the surrounding air of the discharge electrode 60 or cotton dust has positive ions deposited thereon from the corona. The fine particles and dust thus become positively charged. As a result, they are attracted by the Coulomb force between the two electrodes toward the negatively charged dust collection electrode 70 where they are caught, thereby effecting electric dust collection. When the air contains fine particles having a disagreeable odor, the odor components are adsorbed by the catalyst layer 77 on the dust collection electrode 70 and deodorized. Thus, the air which passed through the heat exchanger 30 is purified in the course of passing through the air passage 31 on the back side thereof and is then discharged into the room through the air outlet port 12.

Here, because the dust collection electrode 70 is disposed on the lee (downstream) side of the discharge electrode 60, the wind force of air flowing through the air passage 31 and the Coulomb force exerted on the dust from the dust collection electrode 70, direct the dust toward the dust collection electrode 70. By this step, it is possible to collect a larger amount of dust on the dust collection electrode 70 to improve the dust collection effect by the dust collector 50.

Figure 7:
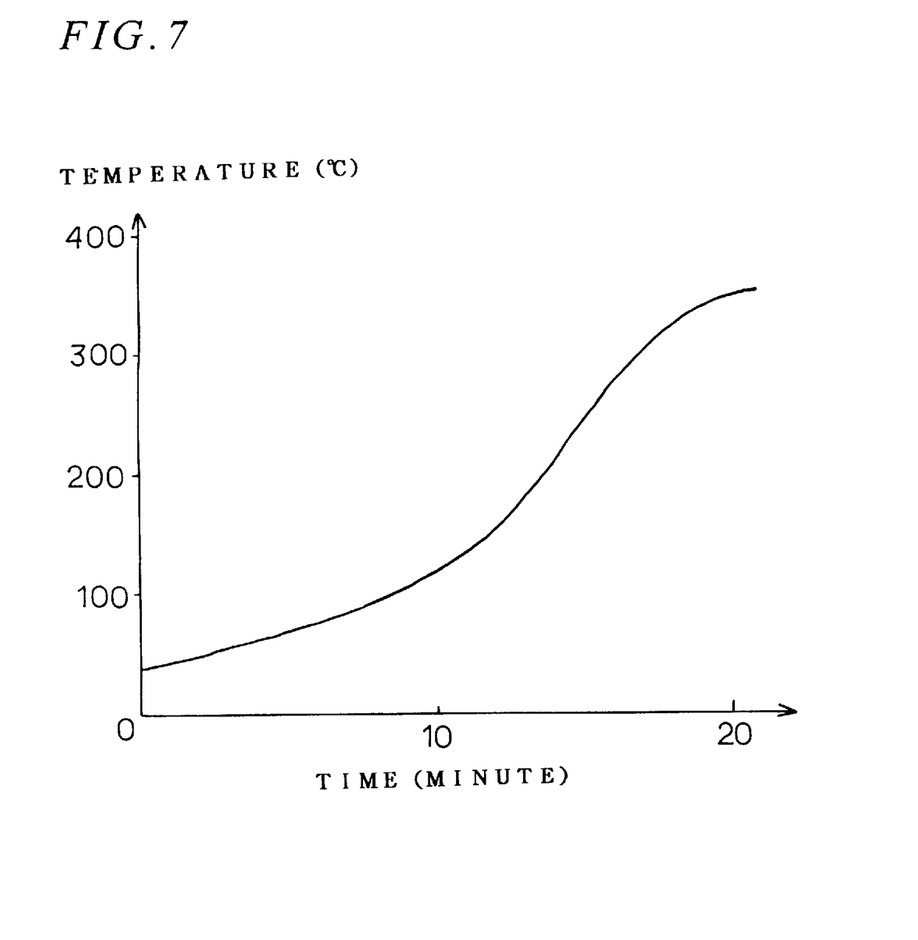
FIG. 7 is a view showing the relations between the surface temperature of the dust collection electrode and the time during the self-cleaning.
Figure 8:
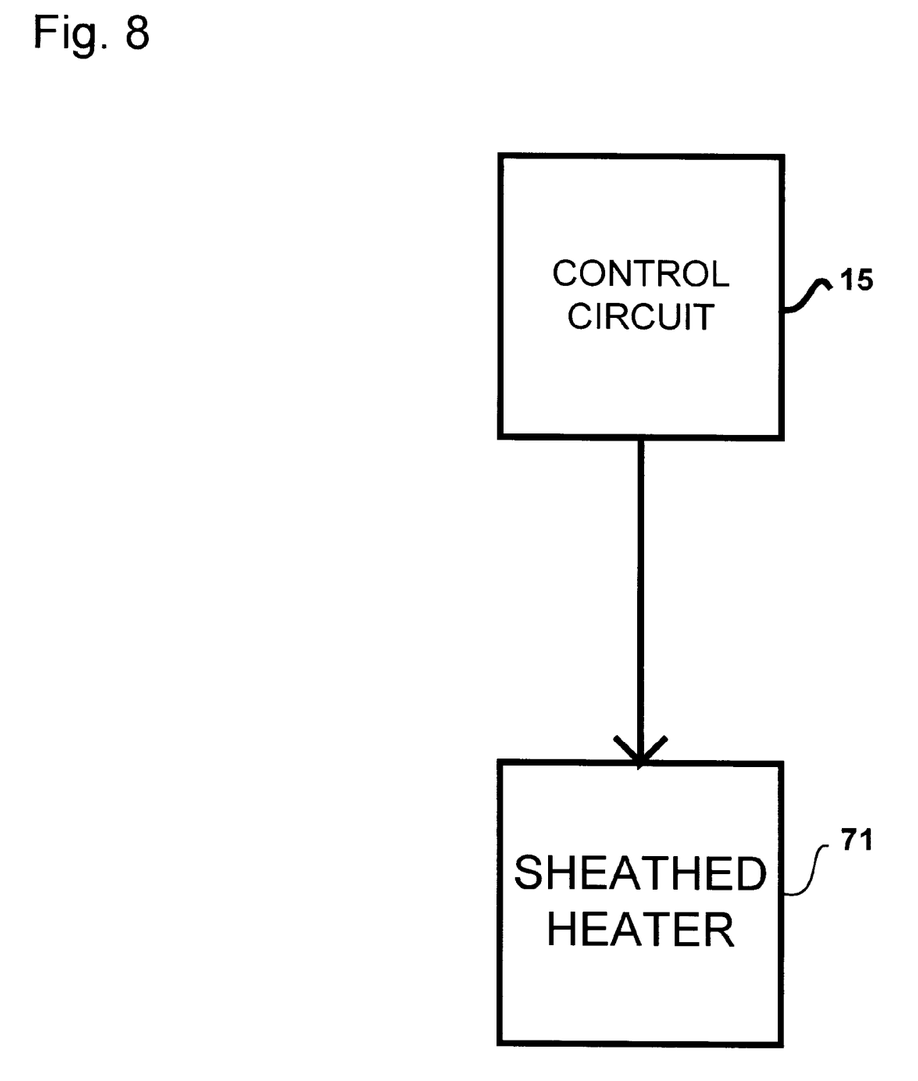
FIG. 8 is a simplified block diagram of the heater and the control circuit therefor.

Referring to FIG. 7, a self-cleaning method of the dust collection electrode 70 is explained. Self-cleaning is carried out as necessary, but preferably after completion of the air conditioning action of the air conditioner 1. Self-cleaning may be carried out when the air conditioning operation stops after a lapse of a predetermined air conditioning operation time. Referring to FIGS. 7 and 8, the control circuit 15 controls electric current to the heater 71 to slowly increase the surface temperature of the dust collection electrode 70 over a period of about 20 minutes (i.e., about 15° C./min.) from room temperature (18° C.) to about 350° C.

By such control, soot or cotton dust which is adhered to the surface of the dust collection electrode 70 is gradually decomposed by oxidation under the catalytic action of the catalyst and finally is converted to colorless, odorless carbon dioxide and vapor at about a temperature exceeding 300° C. and removed from the dust collection electrode 70. By oxidizing the dust stepwise, the dust collection electrode 70 can be cleaned while avoiding or reducing the generation of smoke and odor resulting from the firing of dust. Since the ultimate surface temperature of the dust collection electrode 70 is controlled to a level lower than the firing temperature of the dust component substance, there is no apprehension that the dust may cause fire or smoke.

Also, in the control circuit 15, the duty of the current or voltage to be applied to the electric resistance line 76 of the sheathed heater 71 may be varied to control the exothermic amount of the sheathed heater 71. A sheathed heater 71 having only about 180 W, gives a system with small energy per unit area. Thus, even if the control circuit 15 maintains a 100% duty ratio (continuously on), it is desirable that the maximum temperature of the sheathed heater is controlled to a level not exceeding 350° C. Furthermore, by maintaining a maximum temperature that is lower than 400° C., which is the lower limit of the firing temperature of the substance contained in surroundings, even if the plastic member constituting the casing 10 or the like comes into contact with the dust collection electrode 70, burning of plastic can be prevented.

Without being limited to the foregoing embodiment, various modifications are feasible in the present invention. For example, the self-cleaning method of the present invention can be applied to an electronic dust collector having only the air-cleaning function. In such a case, self-cleaning of the electronic dust collection electrode can be performed by removing dust on the dust collection electrode while suppressing generation of smoke or odor caused by firing of dust. In this electronic dust collector, the self-cleaning operation may be performed during the cleaning operation after lapse of a predetermined time for the air cleaning operation. Alternatively, the self-cleaning method of the present invention may be applied to the method for reproducing the catalyst on the deodorizing apparatus of the adsorptive type heat decomposition system.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for self-cleaning a dust collection electrode of an electronic dust collector comprising:

positioning a discharge electrode and a dust collection electrode spaced a predetermined distance apart in a stream of air;

connecting a positive terminal of a DC voltage to said discharge electrode;

connecting a negative terminal of said DC voltage to said dust collection electrode, wherein said distance and said DC voltage are effective to produce a corona discharge in said predetermined distance, whereby ionized dust is collected on a surface of said dust collection electrode;

coating said dust collection electrode with a catalyst layer;

heating said dust collection electrode at a rate and to a final temperature effective to oxidize collected dust without generating fire or smoke;

the step of heating including slowly increasing the temperature of the dust collection electrode to oxidize and decompose the dust deposited on said catalyst stepwise.

2. The method for self-cleaning the dust collection electrode of an electronic dust collector according to claim 1, wherein the step of heating includes controlling the application of electric current to the heater so that the surface temperature of the dust collection electrode gradually rises from room temperature to the temperature less than the firing temperature of the dust component material during the self-cleaning.

3. An electronic dust collector comprising:

a discharge electrode;

a dust collection electrode spaced a predetermined distance from said discharge electrode;

means for applying a high voltage between said discharge electrode and said dust collection electrode to produce a corona discharge;

a positive terminal of said high voltage being connectable to said discharge electrode, and a negative terminal being connectable to said dust collection electrode, whereby dust is ionized during its passage through said corona discharge, and is attracted to and held on said dust collection electrode;

a heater for self-cleaning said dust collection electrode;

a catalyst layer on said dust collection electrode for oxidizing and decomposing dust deposited on its surface;

a control means for controlling electric current to said heater to increase at a rate which gradually raises a surface temperature of said dust collection electrode during self-cleaning of said dust collection electrode.

4. The electronic dust collector having a self-cleaning function according to claim 3, wherein said control means controls the application of electricity to the heater so that the surface temperature of the dust collection electrode gradually rises from room temperature to the temperature lower than a firing temperature of the dust component material during the self-cleaning.

5. An air conditioner with electronic dust collector having a self-cleaning function for purifying air by collecting dust in air by the use of electric discharge effect, comprising:

a casing having an air suction port and an air outlet port;

a heat exchanger in said casing facing said suction port;

a fan for circulating air into the outlet port from the suction port through the heat exchanger and air passages in the casing;

an electronic dust collector in said air passages for collecting dust in air which passes through the air passages using the discharge effect between the discharge electrode and the dust collection electrode of the electronic dust collector, the dust collection electrode including a heater associated therewith for self-cleaning said dust collection electrode;

a catalyst on a surface of said dust collection electrode for oxidizing and decomposing dust on its surface;

a self-cleaning function; and said self-cleaning function including a control means for controlling the electric current to the heater in a manner that gradually heats the surface temperature of the dust collection electrode gradually during self-cleaning of the dust collection electrode.

6. The air conditioner with electronic dust collector having a self-cleaning function according to claim 5, wherein the control means control the electric current to the heater so that the surface temperature of the dust collection electrode gradually rises from room temperature to the temperature less than the firing temperature of the dust component material during the self-cleaning.

7. The air conditioner with electronic dust collector according to claim 5 wherein said heater has an energy per unit area that is small enough that said surface temperature remains below said firing temperature even if said control means applies electricity at 100% duty.

* * * * *